(12) United States Patent
Sung et al.

(10) Patent No.: US 7,845,912 B2
(45) Date of Patent: Dec. 7, 2010

(54) DRIVING CONTROLLING APPARATUS FOR LINEAR COMPRESSOR AND METHOD THEREOF

(75) Inventors: Ji-Woon Sung, Seoul (KR); Jae-Yoo Yoo, Gyeonggi-Do (KR); Chel-Woong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 963 days.

(21) Appl. No.: 11/554,741

(22) Filed: Oct. 31, 2006

(65) Prior Publication Data

US 2007/0241698 A1 Oct. 18, 2007

(30) Foreign Application Priority Data

Apr. 13, 2006 (KR) ............... 10-2006-0033778

(51) Int. Cl.
F04B 49/06 (2006.01)
F04B 35/04 (2006.01)
H02K 33/00 (2006.01)

(52) U.S. Cl. ............... 417/44.11; 417/417; 417/53; 318/119

(58) Field of Classification Search ............ 417/44.11, 417/417, 53; 318/119, 127, 128
See application file for complete search history.

(56) References Cited

U.S. PATENT DOCUMENTS

| 6,930,462 | B2 | 8/2005 | Yoo et al. | |
| 7,408,310 | B2 * | 8/2008 | Hong et al. | 318/119 |
| 7,459,868 | B2 * | 12/2008 | Yoo et al. | 318/119 |
| 2004/0071556 | A1 | 4/2004 | Sung et al. | |
| 2006/0153688 | A1 | 7/2006 | Lee et al. | |
| 2006/0228224 | A1 | 10/2006 | Hong et al. | |

OTHER PUBLICATIONS

U.S. Appl. No. 11/554,700 to Sung et al., which was filed on Oct. 31, 2006.

* cited by examiner

Primary Examiner—Charles G Freay
(74) Attorney, Agent, or Firm—KED & Associates, LLP

(57) ABSTRACT

A driving controlling apparatus for a linear compressor, comprises: a storing unit for storing a reference phase difference to judge an overload state; and a controlling unit for judging an overload state based on a comparison result between the reference phase difference and a phase difference between a current and a stroke, and controlling a voltage or a current applied to a linear motor based on the judgement result.

17 Claims, 5 Drawing Sheets

DRIVING CONTROLLING APPARATUS FOR LINEAR COMPRESSOR AND METHOD THEREOF

RELATED APPLICATION

The present disclosure relates to subject matter contained in priority Korean Application No. 10-2006-0033778, filed on Apr. 13, 2006, which is herein expressly incorporated by reference in its entirety.

BACKGROUND OF THE INVENTION

1. Field of the Invention

The present invention relates to a linear compressor, and more particularly, to a driving controlling apparatus for a linear compressor capable of stably varying a stroke in a large cooling capacity condition by implementing a voltage control mode at the time of an overload (more than a TDC), and by implementing a current control mode at the time of a normal load (less than the TDC), and a method thereof.

2. Description of the Background Art

Generally, a linear compressor reciprocates a piston with using a linear motion of a motor by directly connecting the piston to a mover of a linear motor.

When the linear compressor is applied to a compressor or a refrigerator a compression ratio of the linear compressor is varied by varying a voltage inputted to the linear compressor thus to control a cooling capacity.

FIG. 1 is a block diagram showing a driving controlling apparatus for a linear compressor in accordance with the related art.

As shown in FIG. 1, the driving controlling apparatus for a linear compressor comprises a current detecting unit 4 for detecting a current applied to a motor; a voltage detecting unit 3 for detecting a voltage applied to the motor; a stroke estimating unit 5 for estimating a stroke by the detected current, the detected voltage, and a motor parameter; a comparing unit 1 for comparing the stroke estimation value with a stroke reference value thereby outputting a difference value therebetween; and a controlling unit 2 for controlling a stroke by varying a voltage applied to the motor according to the difference value.

An operation of the related art driving controlling apparatus for a linear compressor will be explained.

The current detecting unit 4 detects a current applied to the motor, and a voltage detecting unit 3 detects a voltage applied to the motor.

The stroke estimating unit 5 calculates a stroke estimation value by using the detected current, the detected voltage, and a motor parameter. Then, the stroke estimating unit 5 applies the stroke estimation value to the comparing unit 1.

Then, the comparing unit 1 compares the stroke estimation value with the stroke command value, and applies a difference value therebetween to the controlling unit 2. Then, the controlling unit 2 varies a voltage applied to the motor thus to control a stroke.

As shown in FIG. 2, when the stroke estimation value is greater than the stroke command value, the controlling unit 2 decreases the voltage applied to the motor. On the contrary, when the stroke estimation value is smaller than the stroke command value, the controlling unit 2 increases the voltage applied to the motor.

The linear compressor obtains a stroke estimation value by using a motor parameter ($\alpha$), a resistance (R), and a reactance (L), and controls the stroke by using the stroke estimation value.

The related art linear compressor using a stroke voltage controls a voltage by controlling an LC resonance with using a capacitor.

In the related art linear compressor, since the voltage applied to the motor and the stroke are in proportional to each other, it is easy to perform a TDC control and a stroke variation.

However, as shown in FIG. 3, when a voltage control is performed in the linear compressor with a removed capacitor, the voltage applied to the linear compressor is not proportional to the stroke but a stroke tremble phenomenon occurs. Accordingly, it is difficult to perform the stroke variation.

Furthermore, in the linear compressor with the removed capacitor, a driving efficiency and a reliability of the linear compressor are lowered at the time of an over-stroke occurrence due to the stroke trembling phenomenon.

SUMMARY OF THE INVENTION

Therefore, an object of the present invention is to provide a driving controlling apparatus for a linear compressor capable of stably varying a stroke in a large cooling capacity condition by judging a load state according to a phase difference between a current and a stroke, then by implementing a voltage control mode at the time of an overload (more than a TDC), and by implementing a current control mode at the time of a normal load (less than the TDC), and a method thereof.

To achieve these and other advantages and in accordance with the purpose of the present invention, as embodied and broadly described herein, there is provided a driving controlling apparatus for a linear compressor, comprising: a storing unit for storing a reference phase difference to judge an overload state; and a controlling unit for judging an overload state based on a comparison result between the reference phase difference and a phase difference between a current and a stroke, and controlling a voltage or a current applied to a linear motor based on the judgement result.

According to another aspect of the present invention, the driving controlling apparatus for a linear compressor, comprises: a storing unit for storing a reference phase difference to judge an overload state; a controlling unit for judging an overload state based on a comparison result between the reference phase difference and a phase difference between a current and a stroke, and outputting a mode selection control signal for selecting a voltage control mode or a current control mode based on the judgement result; a first comparing unit for comparing a current command value with a current applied to a linear motor when the current control mode is selected by the mode selection control signal, and outputting a current compensation signal based on the comparison result; a second comparing unit for comparing a voltage command value with a voltage applied to the linear motor when the voltage current control mode is selected by the mode selection control signal, and outputting a voltage compensation signal based on the comparison result; a PWM controlling unit for outputting a PWM control signal to vary the current applied to the linear motor or the voltage applied to the linear motor based on the current compensation signal or the voltage compensation signal, and an inverter for varying the current applied to the linear motor or the voltage applied to the linear motor based on the PWM control signal.

To achieve these and other advantages and in accordance with the purpose of the present invention, as embodied and broadly described herein, there is also provided a driving controlling apparatus for a linear compressor driven with a constant stroke command value, the method comprising:

detecting a voltage or a current applied to a linear motor thereby calculating a stroke; detecting a phase difference between the calculated stroke and a current; and comparing the detected phase difference with a reference phase difference, selecting a voltage control mode or a current control mode based on the comparison result, and thereby driving the linear motor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, will be explained a driving controlling apparatus for a linear compressor capable of stably varying a stroke in a large cooling capacity condition by judging a load state according to a phase difference between a current and a stroke, then by implementing a voltage control mode at the time of an overload (more than a TDC), and by implementing a current control mode at the time of a normal load (less than the TDC), and a method thereof.

Figure 1:
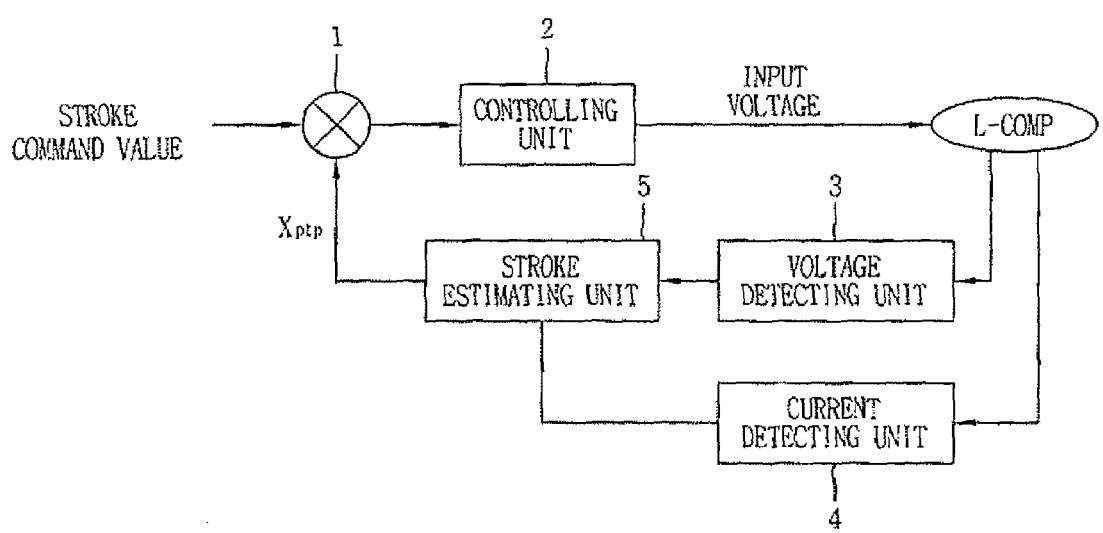
FIG. 1 is a block diagram showing a driving controlling apparatus for a linear compressor in accordance with the related art.
Figure 2:
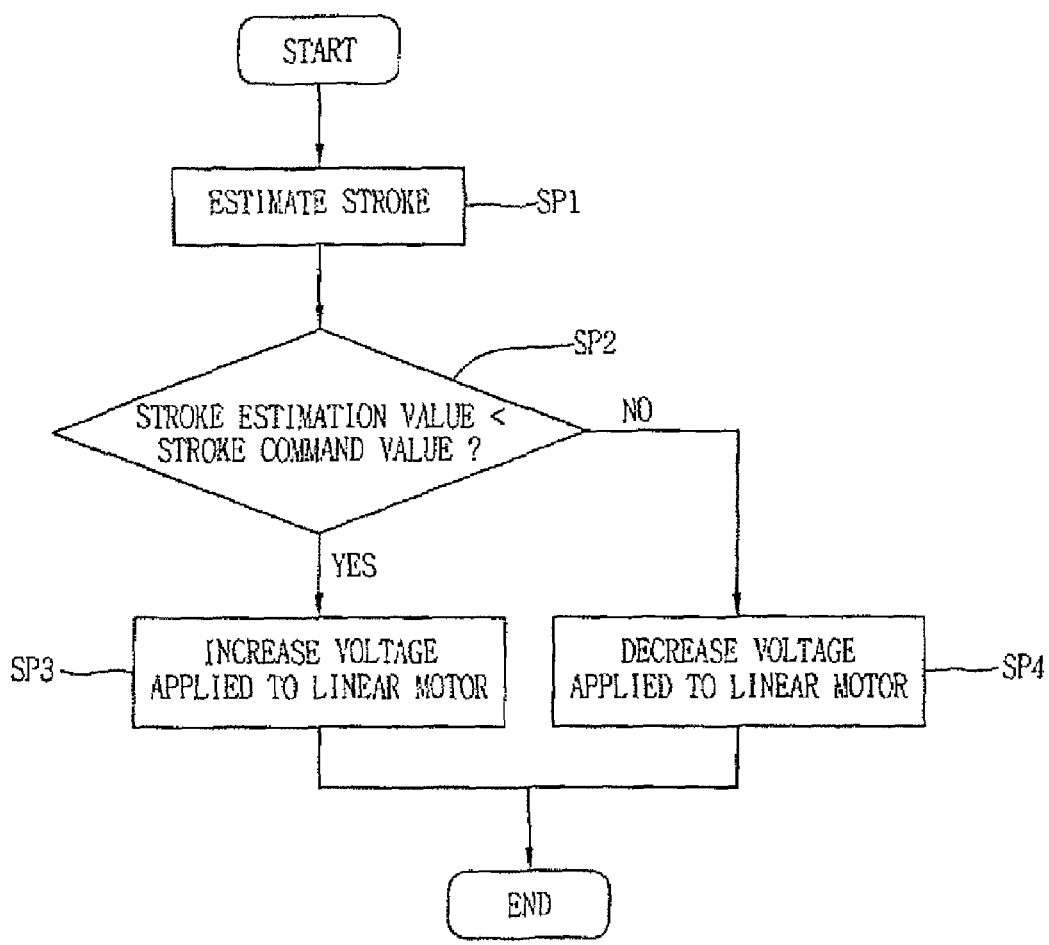
FIG. 2 is a flowchart showing a driving controlling method for a linear compressor in accordance with the related art.
Figure 3:
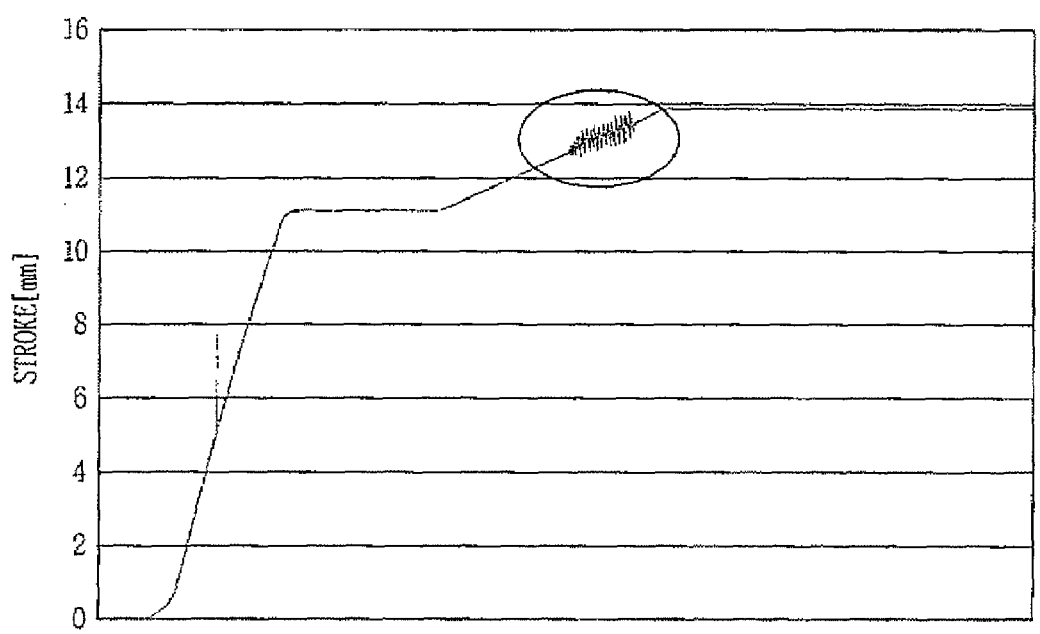
FIG. 3 is a view showing a relation between a voltage and a stroke in a linear compressor in accordance with the related art.
Figure 4:
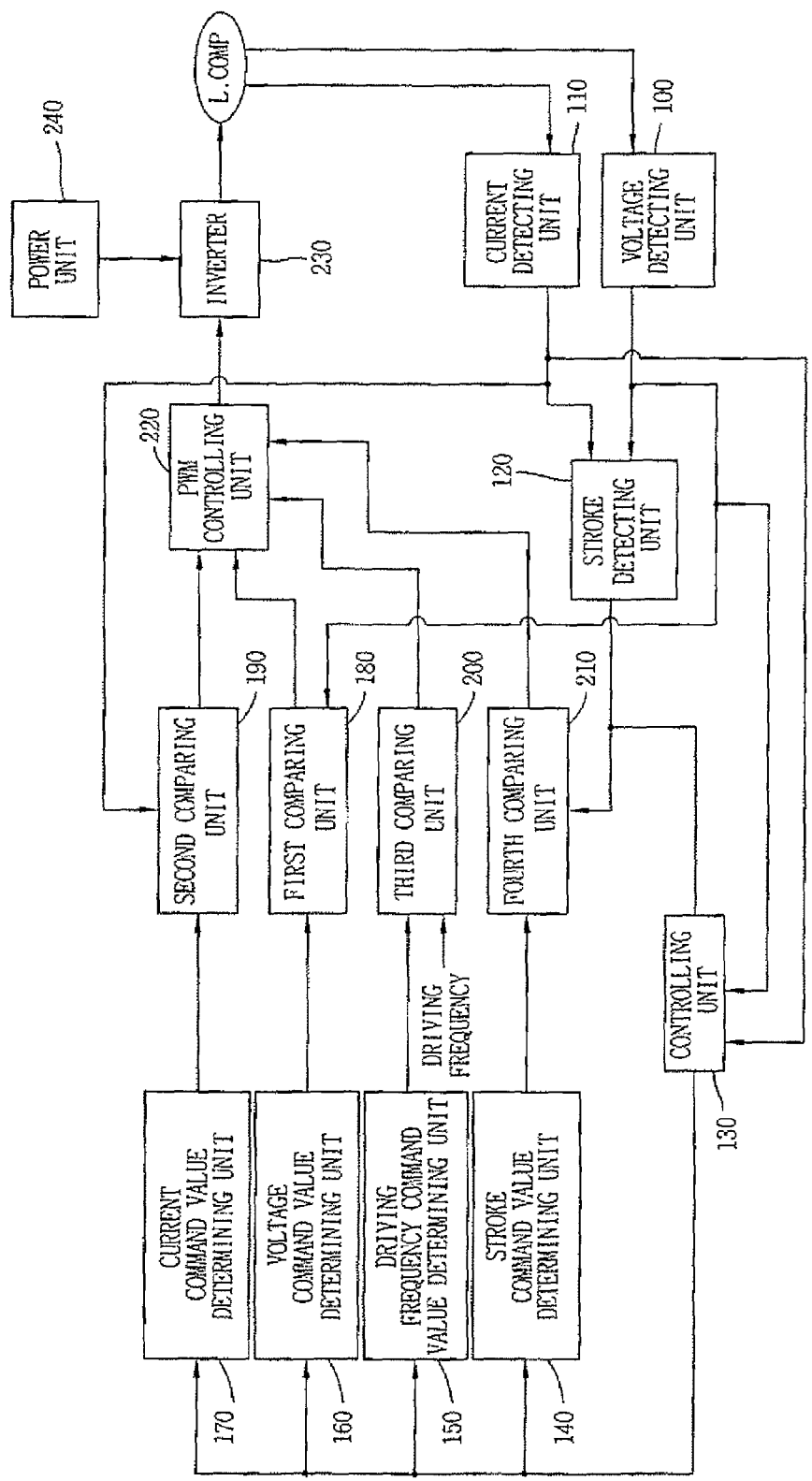
FIG. 4 is a block diagram showing a driving controlling apparatus for a linear compressor according to the present invention.
Figure 5:
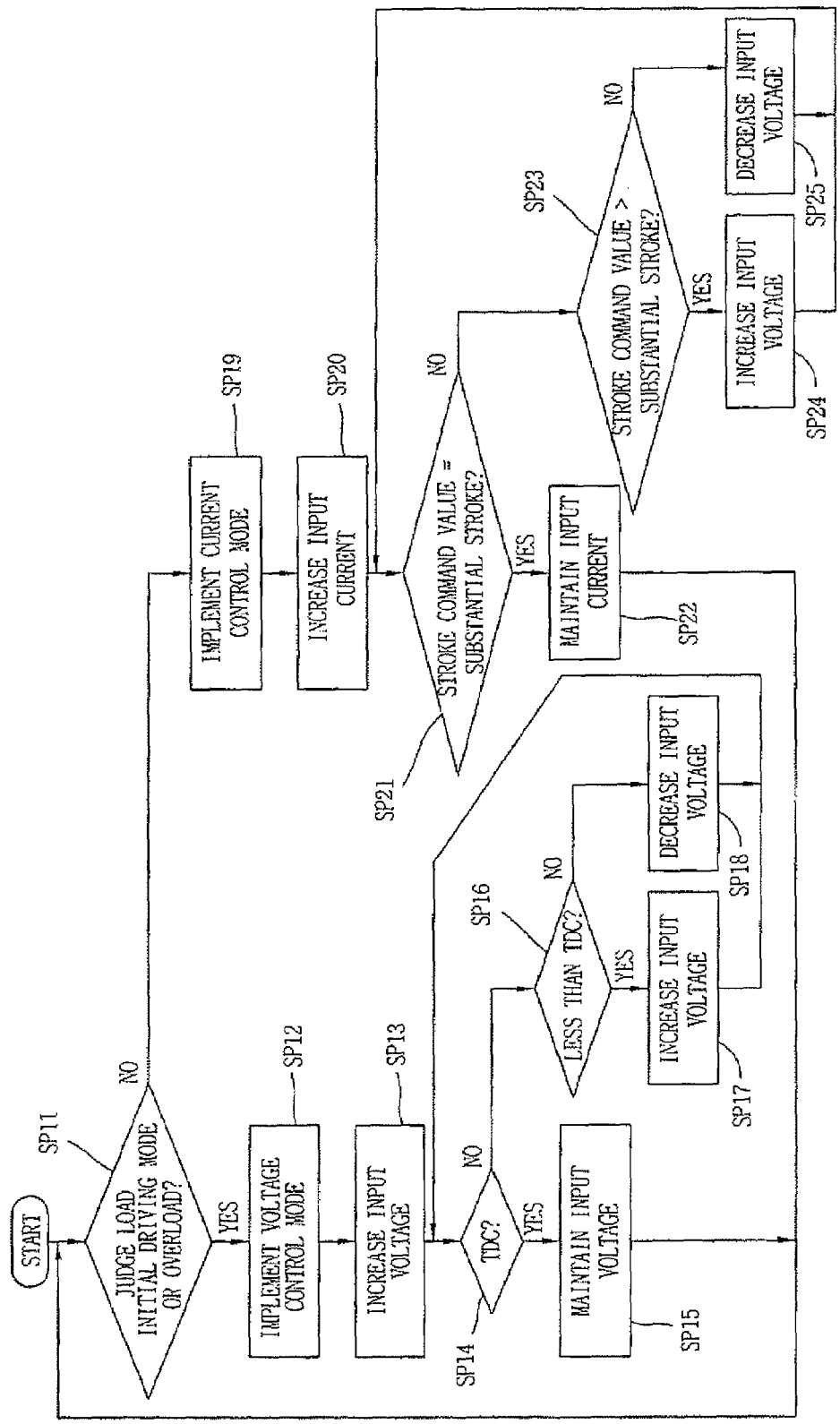
FIG. 5 is a flowchart showing a driving controlling method for a linear compressor according to the present invention.

FIG. 4 is a block diagram showing a driving controlling apparatus for a linear compressor according to the present invention.

As shown in FIG. 4, the driving controlling apparatus for a linear compressor according to the present invention comprises a voltage detecting unit 100, a current detecting unit 110, a stroke detecting unit 120, a controlling unit 130, a first comparing unit 180, a second comparing unit 190, a third comparing unit 200, a fourth comparing unit 210, a stroke command value determining unit 140, a driving frequency determining unit 150, a voltage command value determining unit 160, a current command value determining unit 170, a PWM controlling unit 220, an inverter 230, and a power unit 240.

The current detecting unit 110 detects a current of a motor of a linear compressor, and the voltage detecting unit 100 detects a voltage of the motor of the linear compressor.

The stroke detecting unit 120 calculates a stroke by using the detected current and the detected voltage.

When a phase difference between the current and the stroke is smaller than a reference phase difference, the controlling unit 130 judges as an overload state thus to implement a voltage control mode. On the contrary, when the phase difference between the current and the stroke is larger than the reference phase difference, the controlling unit 130 judges as a normal load state thus to implement a current control mode.

In the voltage control mode, the controlling unit 130 increases a voltage applied to the linear motor. When a piston is positioned at a top dead center (TDC), the voltage is maintained. However, when the piston is at a point less than the TDC, the input voltage is increased. Also, when the piston is more than the TDC, the input voltage is decreased.

When a phase difference between the current and the stroke is smaller than a reference phase difference, the controlling unit 130 judges as an overload state. Then, the controlling unit 130 outputs a stroke control signal for varying the stroke into a full stroke, and outputs a frequency control signal for varying the driving frequency into one larger than a resonance frequency.

In the current control mode, the controlling unit 130 increases a current applied to the linear motor. When the stroke is consistent with a stroke command value, the current is maintained. However, when the stroke is greater than the stroke command value, the current is decreased. Also, when the stroke is smaller than the stroke command value, the current is increased.

When a phase difference between the current and the stroke is larger than a reference phase difference, the controlling unit 130 judges as a normal load state. Then, the controlling unit 130 outputs a stroke control signal for varying a capacity, and outputs a frequency control signal for varying a driving frequency into a resonance frequency.

In order to detect the resonance frequency, the controlling unit 130 varies the frequency and the stroke so that the phase difference between the current and the stroke can be 90°, or so that a phase difference between a speed and a current can be 0°.

The controlling unit 130 may calculate the resonance frequency by directly calculating a gas spring constant.

The driving frequency command value determining unit 150 determines a driving frequency command value based on the frequency control signal.

The stroke command value determining unit 140 determines a stroke command value based on the stroke control signal.

The voltage command value determining unit 160 determines a voltage command value based on the stroke control signal.

The current command value determining unit 170 determines a current command value based on the stroke control signal.

At the time of the current control mode, the first comparing unit 180 compares the current command value with the current applied to the linear motor, and outputs a current compensation signal based on the comparison result.

At the time of the voltage control mode, the second comparing unit 190 compares the voltage command value with the voltage applied to the linear motor, and outputs a voltage compensation signal based on the comparison result.

The third comparing unit 200 compares the driving frequency command value with the driving frequency, and outputs a frequency compensation signal based on the comparison result.

The fourth comparing unit 210 compares the stroke command value with the stroke, and outputs a stroke compensation signal based on the comparison result.

The PWM controlling unit 220 outputs a PWM control signal for varying the current and the voltage applied to the linear motor based on the current compensation signal or the voltage compensation signal. Also, the PWM controlling unit 220 outputs a PWM control signal for varying the driving frequency and the stroke based on the frequency compensation signal or the stroke compensation signal.

The PWM control signal consists of a PWM duty ratio varying signal, and a PWM period varying signal. A stroke voltage is varied according to the PWM duty ratio varying signal, and a driving frequency is varied according to the PWM period varying signal.

The current applied to the linear motor is also varied according to the PWM duty varying signal. When the current command value is smaller than the input current, the PWM duty ratio is increased. On the contrary, when the current command value is larger than the input current, the PWM duty ratio is decreased.

The inverter 190 varies the voltage applied to the linear motor and the driving frequency according to the PWM control signal.

That is, the inverter 190 is operated accordingly as on/off time of a switching device provided therein is controlled by the PWM control signal. Then, the inverter 190 varies a frequency and level of a direct current outputted from the power unit 200 or the current applied to the linear motor thus to apply them to the linear motor.

The power unit 200 rectifies or smoothens a commercial alternating current thus to generate a direct current.

An operation of the driving controlling apparatus for a linear compressor will be explained with reference to FIG. 4.

It is assumed that the linear compressor is driven with a constant stroke command value.

The current detecting unit 110 detects a current applied to the motor of the linear compressor, and the voltage detecting unit 100 detects a voltage applied to the motor of the linear compressor.

The stroke detecting unit 120 calculates a stroke by using the detected current and the detected voltage.

The controlling unit 130 detects a phase difference between the detected current and the detected stroke, and judges a load based on the detected phase difference (SP11)

When the load is increased, a gas spring constant of the linear compressor is increased and thus a phase difference between the current and the stroke is decreased.

More concretely, when the phase difference between the current and the stroke is 90°, a resonance frequency is formed and a load of the linear compressor is judged as a middle load. When the phase difference between the current and the stroke is 60°, the load of the linear compressor is judged as an overload.

When the phase difference between the current and the stroke is 90°, the piston is positioned at the TDC.

The TDC represents a 'Top Dead Center' point of the piston of the linear compressor, and denotes a stroke when a compression process of the piston is completed.

Since the linear compressor has the most excellent efficiency when the TDC is 0, the piston is controlled so as to be positioned at a point as TDC=0 in the present invention. The point as TDC=0 is referred to as a TDC in the present invention.

When the linear compressor is judged to be in an overloaded state or an initial driving mode, the controlling unit 130 outputs a control signal for varying the initial driving mode into a voltage control mode. Then, the controlling unit 130 outputs a control signal for varying the voltage applied to the linear motor.

The voltage command value determining unit 160 increases a voltage command value by the controlling unit 130, and then applies it to the first comparing unit 180. The voltage command value having a sine wave is increased by increasing a size of the sine wave not a period of the sine wave.

The first comparing unit 180 compares the voltage command value with the voltage detected from the voltage detecting unit 100, and applies a voltage compensation signal based on the comparison result to the PWM controlling unit 220.

When the linear compressor is judged to be in an overloaded state or an initial driving mode (SP11), the controlling unit 130 outputs a frequency control signal for varying the driving frequency into one larger than the resonance frequency. Then, the controlling unit 130 outputs a stroke control signal for varying the stroke into a full stroke.

The stroke command value determining unit 140 determines a stroke command value for varying the stroke into a full stroke based on the stroke control signal.

The driving frequency determining unit 150 determines a driving frequency larger than the resonance frequency as a driving frequency command value based on the frequency control signal (SP18). The driving frequency command value is preset according to a load size by an experiment.

The third comparing unit 200 compares the driving frequency command value with the driving frequency, and outputs a frequency compensation signal based on the comparison result.

The fourth comparing unit 210 compares the stroke command value with the stroke, and outputs a stroke compensation signal based on the comparison result.

The PWM controlling unit 220 outputs a PWM control signal based on the frequency compensation signal, the stroke compensation signal, and the voltage compensation signal. The inverter 230 varies the voltage and the driving frequency applied to the linear motor. In the voltage control mode, the controlling unit 130 increases the voltage applied to the linear motor (SP13).

Then, the controlling unit 130 judges whether the piston is positioned at the TDC (SP14). If the piston is positioned at the TDC as a result of the judgement, the controlling unit maintains the voltage applied to the linear motor (SP15).

On the contrary, if the piston is not positioned at the TDC as a result of the judgement, the controlling unit 130 judges whether or not the piston is at a point less than the TDC (SP16). If the piston is at a point less than the TDC, the controlling unit 130 continuously increases the voltage applied to the linear motor. On the contrary, if the piston is at a point more than the TDC, the controlling unit 130 decreases the voltage applied to the linear motor.

When the linear compressor is judged not to be in an overloaded state or an initial driving mode as a result of the judgement (SP11), the controlling unit 130 outputs a control signal for varying the driving frequency into a current control mode (SP19). Then, the controlling unit 130 outputs a control signal to increase the current applied to the linear motor (SP20).

The current command value determining unit 170 increases a current command value by the controlling unit 130, and then applies it to the second comparing unit 190. The current command value having a sine wave is increased by increasing a size of the sine wave not a period of the sine wave.

The second comparing unit 190 compares the current command value with the current detected from the current detecting unit 110, and applies a current compensation signal based on the comparison result to the PWM controlling unit is 220.

When the linear compressor is judged not to be in an overloaded state or an initial driving mode (SP11), the controlling unit 130 outputs a stroke control signal for varying a capacity of the linear motor, and outputs a frequency control signal for varying the driving frequency into the resonance frequency.

The stroke command value determining unit 140 determines a stroke command value for varying a capacity of the linear motor so as to correspond to a present load.

The driving frequency determining unit 150 determines the resonance frequency as a driving frequency command value based on the frequency control signal.

The third comparing unit 200 compares the driving frequency command value with the driving frequency, and outputs a frequency compensation signal based on the comparison result.

The fourth comparing unit 210 compares the stroke command value with the stroke, and outputs a stroke compensation signal based on the comparison result.

The PWM controlling unit 220 outputs a PWM control signal based on the frequency compensation signal or the stroke compensation signal. The inverter 230 switches a voltage outputted from the power unit 240 based on the PWM control signal, thereby varying the stroke voltage and the driving frequency applied to the linear motor.

The controlling unit 130 increases the current applied to the linear motor (SP20), and judges whether the stroke command value is consistent with the stroke (SP21). If the stroke command value is consistent with the stroke as a result of the judgement, the controlling unit 130 maintains the current applied to the linear motor (SP22).

If the stroke command value is not consistent with the stroke as a result of the judgement, the controlling unit 130 judges whether the stroke command value is larger than the stroke (SP23). If the stroke command value is larger than the stroke as a result of the judgement, the controlling unit 130 increases the current applied to the linear motor. On the contrary, if the stroke command value is smaller than the stroke as a result of the judgement, the controlling unit 130 decreases the current applied to the linear motor.

In the linear compressor according to the present invention, a load is judged by detecting a phase difference between a current and a stroke. If it is judged as an overload as a result of the judgement, a voltage applied to the linear motor is varies in a voltage control mode. Then, a driving frequency is varied so as to be larger than a resonance frequency, and the stroke is varied into a full stroke. Accordingly, a TDC control can be more stably performed in a large cooling capacity condition.

In the linear compressor according to the present invention, a load is judged by detecting a phase difference between a current and a stroke. If it is judged as a middle load or a small load as a result of the judgement, a current control mode is implemented thus to vary the current applied to the linear motor. Then, a stroke control signal for varying a capacity is outputted, and a driving frequency is changed into a resonance frequency. Accordingly, the stroke less than the TDC can be easily varied and thus a reliability of the linear compressor can be enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A driving controlling apparatus for a linear compressor, comprising:
    a current detecting unit for detecting a current of a motor of the linear compressor;
    a voltage detecting unit for detecting a voltage of the motor of the linear compressor;
    a stroke detecting unit for calculating a stroke using the detected current and the detected voltage; and
    a controlling unit for determining an overload state based on a comparison result between a reference phase difference and a phase difference between the detected current and the calculated stroke, and the controlling unit controlling a voltage or a current applied to a linear motor based on the determining result,
    wherein when the phase difference between the detected current and the calculated stroke is smaller than the reference phase difference, the controlling unit determines an overload state to thus implement a voltage control mode, and when the phase difference between the detected current and the calculated stroke is larger than the reference phase difference, the controlling unit determines a normal load state to thus implement a current control mode, and
    wherein in the current control mode, when the stroke is consistent with a stroke command value, the controlling unit maintains the current applied to the linear motor, when the stroke is larger than the stroke command value, the controlling unit decreases the current applied to the linear motor, and when the stroke is smaller than the stroke command value, the controlling unit continuously increases the current applied to the linear motor.

2. The apparatus of claim 1, wherein in the voltage control mode, when a piston is positioned at a top dead center (TDC), the controlling unit maintains the voltage applied to the linear motor, when the piston is less than the TDC, the controlling unit continuously increases the voltage applied to the linear motor, and when the piston is more than the TDC, the controlling unit decreases the voltage applied to the linear motor.

3. The apparatus of claim 1, wherein the controlling unit outputs a stroke control signal for varying a stroke command value and outputs a frequency control signal for varying a driving frequency command value according to a load.

4. The apparatus of claim 1, wherein when the phase difference between the detected current and the calculated stroke is smaller than the reference phase difference, the controlling unit determines an overload state, outputs a stroke control signal for varying the stroke into a full stroke, and outputs a frequency control signal for varying a driving frequency so as to be larger than a resonance frequency.

5. The apparatus of claim 1, wherein when the phase difference between the detected current and the calculated stroke is larger than the reference phase difference, the controlling unit determines a normal load state, outputs a stroke control signal for varying a capacity of the linear motor, and outputs a frequency control signal for varying a driving frequency into a resonance frequency.

6. A driving controlling apparatus for a linear compressor, comprising:
    a current detecting unit for detecting a current of a motor of the linear compressor;
    a voltage detecting unit for detecting a voltage of the motor of the linear compressor;
    a stroke detecting unit for calculating a stroke using the detected current and the detected voltage;

a controlling unit for determining an overload state based on a comparison result between a reference phase difference and a phase difference between the detected current and the calculated stroke, and outputting a mode selection control signal for selecting a voltage control mode or a current control mode based on the determining result;

a first comparing unit for comparing a current command value with a current applied to a linear motor when the current control mode is selected by the mode selection control signal, and outputting a current compensation signal based on the comparison result;

a second comparing unit for comparing a voltage command value with a voltage applied to the linear motor when the voltage current control mode is selected by the mode selection control signal, and outputting a voltage compensation signal based on the comparison result;

a pulse width modulation (PWM) controlling unit for outputting a PWM control signal to vary the current or the voltage applied to the linear motor based on the current compensation signal or the voltage compensation signal; and an inverter for varying the current applied to the linear motor or the voltage applied to the linear motor based on the PWM control signal, wherein when the phase difference between the detected current and the calculated stroke is smaller than the reference phase difference, the controlling unit determines an overload state to thus implement a voltage control mode, and when the phase difference between the current and the stroke is larger than the reference phase difference, the controlling unit determines a normal load state to thus implement a current control mode, and wherein in the current control mode, when the stroke is consistent with a stroke command value, the controlling unit maintains the current applied to the linear motor, when the stroke is larger than the stroke command value, the controlling unit decreases the current applied to the linear motor, and when the stroke is smaller than the stroke command value the controlling unit continuously increases the current applied to the linear motor.

7. The apparatus of claim, 6 wherein in the voltage control mode, when a piston is positioned at a top dead center (TDC), the controlling unit maintains the voltage applied to the linear motor, when the piston is less than the TDC, the controlling unit continuously increases the voltage applied to the linear motor, and when the piston is more than the TDC, the controlling unit decreases the voltage applied to the linear motor.

8. The apparatus of claim 6, wherein the controlling unit outputs a stroke control signal for varying a stroke command value and outputs a frequency control signal for varying a driving frequency command value according to a load.

9. The apparatus of claim 6, wherein when the phase difference between the detected current and the calculated stroke is smaller than the reference phase difference, the controlling unit determines an overload state, outputs a stroke control signal for varying the stroke into a full stroke, and outputs a frequency control signal for varying a driving frequency so as to be larger than a resonance frequency.

10. The apparatus of claim 6, wherein when the phase difference between the detected current and the calculated stroke is larger than the reference phase difference, the controlling unit determines a normal load state, outputs a stroke control signal for varying a capacity of the linear motor, and outputs a frequency control signal for varying a driving frequency into a resonance frequency.

11. The apparatus of claim 6, further comprising:
a driving frequency command value determining unit for determining a driving frequency command value based on a frequency control signal;
a stroke command value determining unit for determining a stroke command value based on a stroke control signal;
a voltage command value determining unit for determining a voltage command value based on the stroke control signal; and
a current command value determining unit for determining a current command value based on the stroke control signal.

12. The apparatus of claim 11, further comprising:
a third comparing unit for comparing the driving frequency command value with the driving frequency, and outputting a frequency compensation signal based on the comparison result; and
a fourth comparing unit for comparing the stroke command value with the stroke, and outputting a stroke compensation signal based on the comparison result.

13. The apparatus of claim 12, wherein the PWM controlling unit outputs a PWM control signal for varying the driving frequency and the stroke based on the frequency compensation signal or the stroke compensation signal.

14. A driving controlling method for a linear compressor driven with a constant stroke command value, the method comprising:
detecting a voltage or a current applied to a linear motor thereby calculating a stroke;
detecting a phase difference between the calculated stroke and a current; and
comparing the detected phase difference with a reference phase difference, selecting a voltage control mode or a current control mode based on the comparison result, and thereby driving the linear motor,
wherein driving the linear motor comprises:
when the phase difference between the current and the calculated stroke is smaller than the reference phase difference, determining as an overload state and thereby implementing a voltage control mode, and
when the phase difference between the current and the calculated stroke is larger than the reference phase difference, determining a normal load state and thereby implementing a current control mode, and
the implementing the current control mode comprises:
when the stroke is consistent with a stroke command value, maintaining the current applied to the linear motor,
when the stroke is larger than the stroke command value, decreasing the current applied to the linear motor, and
when the stroke is smaller than the stroke command value, continuously increasing the current applied to the linear motor.

15. The method of claim 14, wherein implementing the voltage control mode comprises:
when a piston is positioned at a top dead center (TDC), maintaining the voltage applied to the linear motor;
when the piston is less than the TDC, continuously increasing the voltage applied to the linear motor; and
when the piston is more than the TDC, decreasing the voltage applied to the linear motor.

16. The method of claim 14, further comprising:
when the phase difference between the current and the calculated stroke is smaller than the reference phase difference, determining an overload state, outputting a stroke control signal for varying the stroke into a full stroke, and outputting a frequency control signal for varying a driving frequency so as to be larger than a resonance frequency.

17. The method of claim 14, further comprising:

when the phase difference between the current and the calculated stroke is larger than the reference phase difference, determining a normal load state, outputting a stroke control signal for varying a capacity of the linear motor, and outputting a frequency control signal for varying a driving frequency into a resonance frequency.

* * * * *